US011425241B2

(12) United States Patent
Milligan et al.

(10) Patent No.: US 11,425,241 B2
(45) Date of Patent: Aug. 23, 2022

(54) CALL ORIGINATION VALIDATION FOR INCOMING CALLS WITHIN A WIRELESS COMMUNICATION NETWORK

(71) Applicant: T-Mobile USA, Inc., Bellevue, WA (US)

(72) Inventors: Stephen Milligan, Blaine, WA (US); Ingrid Marie Happ, Seattle, WA (US); Jeffrey Wayne Stone, Monroe, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 69 days.

(21) Appl. No.: 17/115,323

(22) Filed: Dec. 8, 2020

(65) Prior Publication Data

US 2022/0182488 A1    Jun. 9, 2022

(51) Int. Cl.
*H04W 12/72* (2021.01)
*H04M 3/42* (2006.01)
*H04W 4/16* (2009.01)
*H04W 80/10* (2009.01)
*H04M 3/493* (2006.01)
*H04W 12/40* (2021.01)
*H04W 12/06* (2021.01)

(52) U.S. Cl.
CPC ....... *H04M 3/42059* (2013.01); *H04M 3/493* (2013.01); *H04W 4/16* (2013.01); *H04W 12/068* (2021.01); *H04W 12/40* (2021.01); *H04W 12/72* (2021.01); *H04W 80/10* (2013.01); *H04M 2203/6027* (2013.01); *H04M 2203/6045* (2013.01)

(58) Field of Classification Search
CPC ...... H04W 12/06; H04W 12/08; H04W 12/72
See application file for complete search history.

(56) References Cited

U.S. PATENT DOCUMENTS

| 9,578,500 B1* | 2/2017 | Yeduvakula | ............ H04L 63/18 |
| 2014/0323085 A1* | 10/2014 | Wu | ........................ H04M 3/563 455/411 |
| 2019/0068594 A1* | 2/2019 | Sarwar | .................. H04L 9/3231 |

* cited by examiner

*Primary Examiner* — Michael T Vu
(74) *Attorney, Agent, or Firm* — Loeb & Loeb LLP (57) ABSTRACT

A computer-implemented method for validating the origination of an incoming customer call on a wireless communication network may include receiving a SIP invite message at the wireless communication network when the call is initiated, determining whether the SIP invite message includes one or more indicators indicating that the call originated within the wireless communication network from a device with a SIM registered in the wireless communication network, and writing a classification code to a database indicating that the call is validated if the SIP invite message includes the one or more indicators. The method may further include receiving the call at an agent computer device with caller identification information, querying the database via the agent computer device according to the caller identification information to obtain the classification code of the customer call, and suppressing a step used for call authentication if the classification code indicates that the call is validated.

18 Claims, 7 Drawing Sheets

CALL ORIGINATION VALIDATION FOR INCOMING CALLS WITHIN A WIRELESS COMMUNICATION NETWORK

TECHNICAL FIELD

Embodiments discussed herein generally related to methods and systems for automatically validating the origination of incoming customer calls in a wireless communication network.

BACKGROUND

Caller ID spoofing is when a caller deliberately falsifies their caller ID information to appear to be a trusted party on the caller ID display of the called party, allowing the caller to perform scams and fraudulent activities. In wireless network customer service environments, for example, a fraudster may call into the network carrier's customer service system appearing to be a valid customer in an attempt to access the customer's account and perform nefarious activities such as racking up exorbitant charges, canceling the account, or transferring the account to a different carrier so that the fraudster may access the customer's security codes on their own phone. In another example, a fraudster may access a customer's phone and covertly set up call forwarding on the customer's phone to the network's customer service phone number. When the fraudster later dials the customer's phone number, the call may be automatically forwarded to the network carrier's customer service center, potentially allowing the fraudster to gain access to the customer's account while appearing to be the valid customer.

In order to prevent such fraudulent activity, many network customer service systems implement a one-time pin (OTP) sent to the customer's phone for multifactor authentication to prove possession of the caller's device, such as when the caller forgot his or her account passcode and/or seeks to access a high security transaction. The customer may read back the OTP sent to their device for authentication and, once authenticated, the customer service agent may assist in passcode reset and/or access to the desired transaction. While effective, the use of OTPs or other multifactor authentication steps in the customer service environment adds extra steps to the authentication process and requires additional time for both the customer and the service agent. Given that a large fraction of customers forget their account passcodes, the current OTP authentication process uses a significant amount of customer service agent time, and adds additional business expenses for the network carrier.

STIR/SHAKEN technology is traditionally used to verify the origination of calls between different network carriers. In STIR/SHAKEN, the sending carrier may assert that the call originates from a phone number that they own and are responsible for providing to a customer. However, STIR/SHAKEN is not currently implemented to verify customer call origination for customer service calls within a single wireless network. Moreover, a STIR/SHAKEN certification does not verify that a call originated from a device with a subscriber identity module (SIM), and does not identify calls that have been forwarded. For example, T-Mobile DIGITS allows customers to call from one number across multiple devices, including web interfaces. Thus, a calling party may be verified through STIR/SHAKEN even if the call originates from a device without a SIM.

Thus, there is a need for improved technical solutions to call origination validation, particularly in network carrier customer service environments.

SUMMARY

Embodiments disclosed herein apply to systems and computer-implemented methods for validating the origination of incoming calls in a wireless communication network based on indicators in session initiation protocol (SIP) messages of the incoming calls. In one embodiment, a computer-implemented method may include receiving a SIP invite message at the wireless communication network when the call is initiated, and determining, based on indicators in the SIP invite message, whether the call is validated as originating within the wireless communication network from a device with a subscriber identity module (SIM) registered in the wireless communication network, the call origination is unknown, or the call originated on the public service telephone network (PSTN). The method may further include associating the call with a classification code that classifies the call according to whether the call is validated, the call origination is unknown, or the call originated on the PSTN, and writing the classification code to a database accessible by an agent computer device in the wireless communication network. Furthermore, the method may include receiving the call at the agent computer device with call identification information, and querying the database via the agent computer device according to the caller identification information to obtain the classification code of the call and determine if the call is validated. The method may further include suppressing, via the agent computer device, a one-time pin (OTP) prompt used for call authentication if the call is validated.

In another embodiment, a system for validating the origination of incoming customer calls in a single wireless communication network is disclosed. The system may include a network computer system on the wireless communication network and including one or more processors, a memory, and an input-output circuit. The one or more processors may be configured according to computer-executable instructions for receiving a session initiation protocol (SIP) message at the wireless communication network when the customer call is initiated, and determining that the customer call is validated if the SIP message includes one or more indicators indicating that the call originated within the wireless communication network from a device with a subscriber identity module (SIM) registered in the wireless communication network. The one or more processors may be further configured according to computer-executable instructions for inserting an organization header in the SIP message indicating that the customer call is validated if the SIP message includes the one or more indicators and, based on the organization header in the SIP message, writing a classification code to a database that classifies the customer call as validated. The system may further include an agent computer device on the wireless communication network and including a processor, a memory, and an input-output circuit. The processor may be configured according to computer-executable instructions for receiving the customer call via the network computer system with caller identification information, querying the database according to the caller identification information to obtain the classification code of the call and determine if the call is validated, and suppressing a pin prompt used for call authentication at a user interface of the agent computer device if the customer call is validated.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
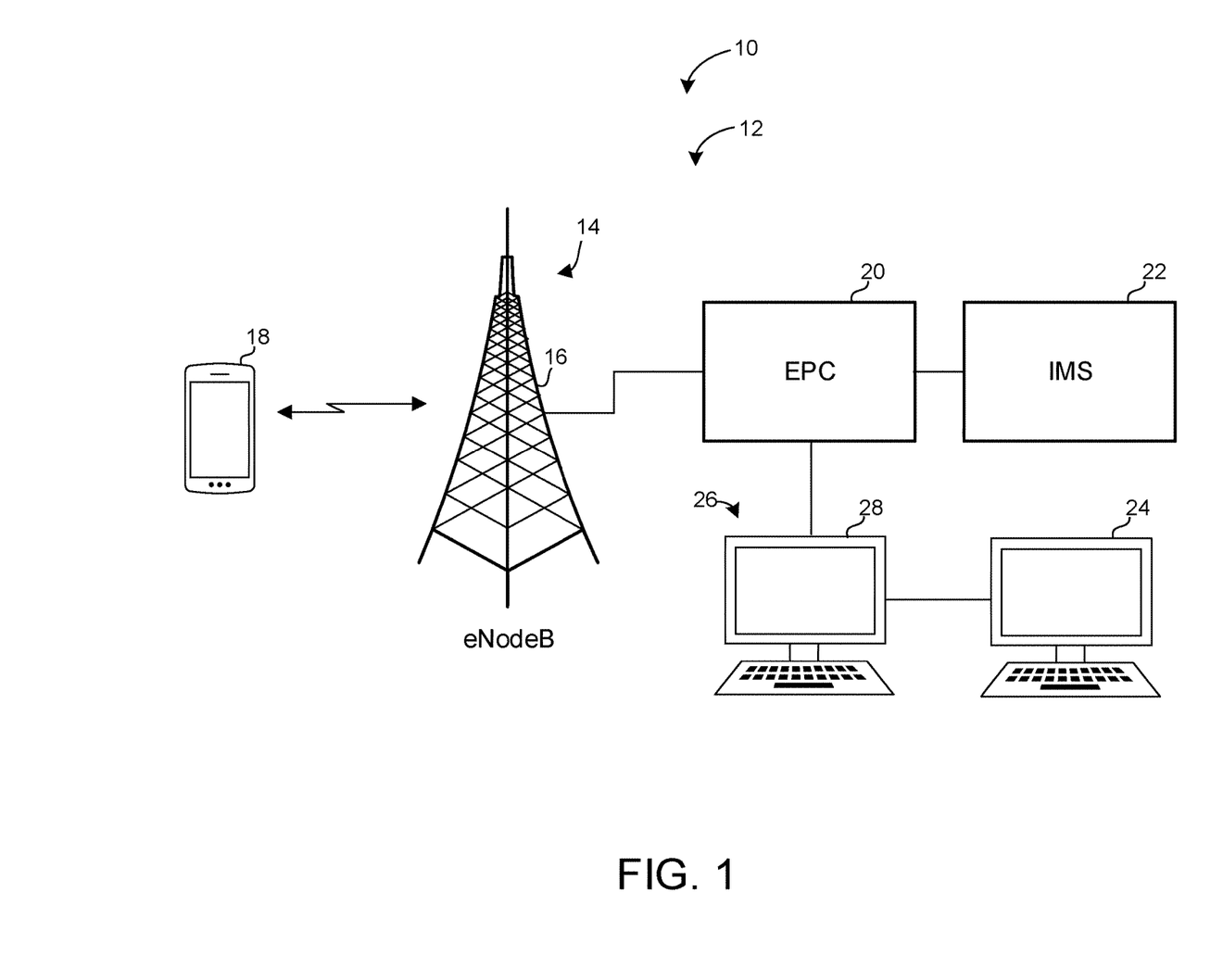
FIG. 1 is a schematic representation of a wireless communication network, according to one embodiment.

Referring now to the drawings and with specific reference to FIG. 1, a wireless communication network 10 is shown. In some embodiments, the wireless communication network 10 may be a Long-Term Evolution (LTE) network 12, such as a 4G LTE network or a 5G LTE network. In one embodiment, the network 10 may include a radio access network (RAN) 14 having a base station 16 (or eNodeBs) for transmitting and receiving wireless signals to and from user devices 18 (e.g., mobile phones, personal computers, tablets, etc.). An evolved packet core (EPC) 20 may participate in call set up and authentication, and may connect to an internet protocol (IP) multimedia subsystem (IMS) 22 involved in delivering multimedia communications (voice, video, etc.) over IP networks. A service network computer system 24 may receive incoming customer calls from users requesting customer services from the network carrier, such as billing information, bill payment, and adding, removing, or upgrading applications on their device. The network 10 may further include a network computer system 26 which may include a session border controller (SBC) computer 28 that reviews and classifies the incoming customer calls based on information in session initiation protocol (SIP) messages in the call requests, and passes the calls to the service network computer system 24 (see further details below).

Figure 2:
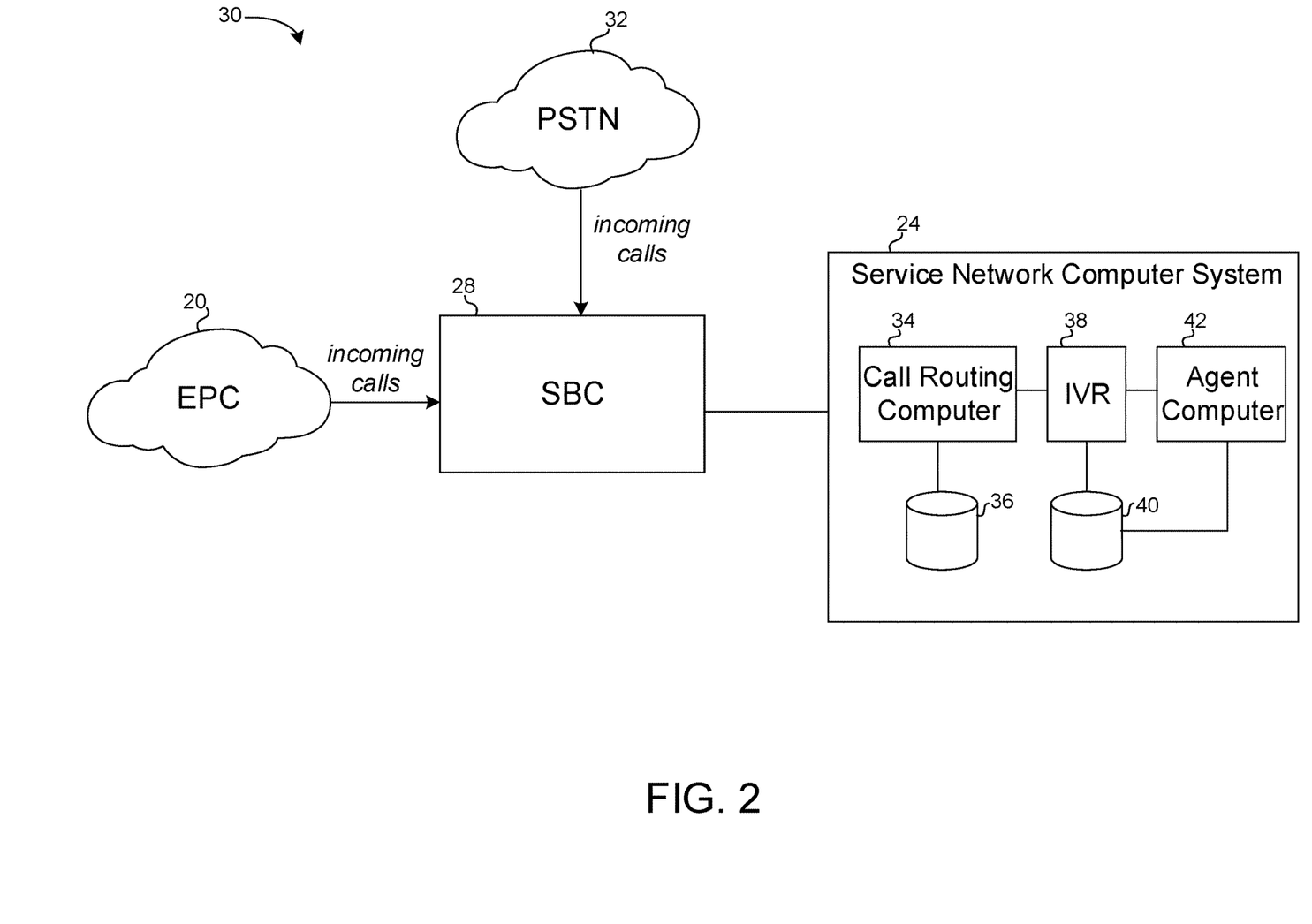
FIG. 2 is a schematic representation of a system for validating the origination of the incoming customer calls, according to one embodiment.

A system 30 for validating the origination of the incoming customer calls in the wireless communication network 10 is shown in FIG. 2. The system 30 may operate to determine which of the incoming customer calls are validated as originating on the wireless communication network 10 from a device 18 with a subscriber identity module (SIM) registered in the wireless communication network 10. That is, the validated calls are recognized as being received from a device 18 with a SIM provided by a carrier of the wireless communication network 10. Further, the system 30 operates to identify incoming calls which are suspect to falsified caller ID information or fraudulent activity, including calls having an unknown origination, forwarded calls, calls originating on the public service telephone network (PSTN), and calls originating from a source without a SIM such as a web interface (e.g., DIGITS calls). Upon reaching the service network computer system 24, the incoming calls which are validated may be treated as candidates for skipping one or more steps used in customer call authentication, saving valuable time for both the customer and the customer service agent that receives the call. In one embodiment, a one-time pin (OTP) used for multifactor call authentication may be skipped if the call is validated.

The incoming customer calls may be received at the SBC computer 28 via the EPC 20 of the wireless communication network 10, or through the PSTN 32. Calls received via the PSTN 32 may be flagged as such, whereas those received directly from the EPC 20 may be treated by STIR/SHAKEN logic in which the network 10 determines whether the calling number is owned and provided to a customer by the carrier of the wireless network 10. If so, the network 10 may provide a STIR/SHAKEN certification in a header of a SIP invite message of the call providing a verification that the network 10 claims responsibility for the calling phone number. As part of the STIR/SHAKEN protocol, the EPC 20 may rewrite caller identification information in the SIP invite message with the correct caller identification information contained in the network databases, including the customer's phone registered number and name.

As explained in further detail below, the SBC computer 28 may review the SIP invite messages (including any STIR/SHAKEN certification headers) of each incoming call to classify the call according to its origination. Once the call is classified, the SBC computer 28 may insert an organization header in the SIP invite message of each incoming call indicating the classification and pass the call requests to the service network computer system 24. A call routing computer 34 associated with the service network computer system 24 may read the organization headers in the SIP invite messages, write a corresponding classification code to a database 36, and transfer the incoming calls to an interactive voice response (IVR) computer system 38. In one non-limiting embodiment, the call routing computer 34 may be an interactive contact management (ICM) system involved in making call routing decisions within the network 10.

The IVR computer system 38 may access the classification code for each call stored in the database 36, and write the classification code to a memory data grid 40 accessible to agent computer devices 42 on the service network computer system 42. If the caller selects to speak with a service agent via the IVR computer system 38, the IVR computer system 38 may transfer the call to an agent computer device 42 with caller ID information. The agent computer device 42 may retrieve the classification code for the call from the memory data grid 40 using the caller ID information. If the classification code indicates that the call is validated, the agent computer device 42 may determine if the call qualifies for bypassing or skipping one or more steps involved in customer call authentication.

Figure 3:
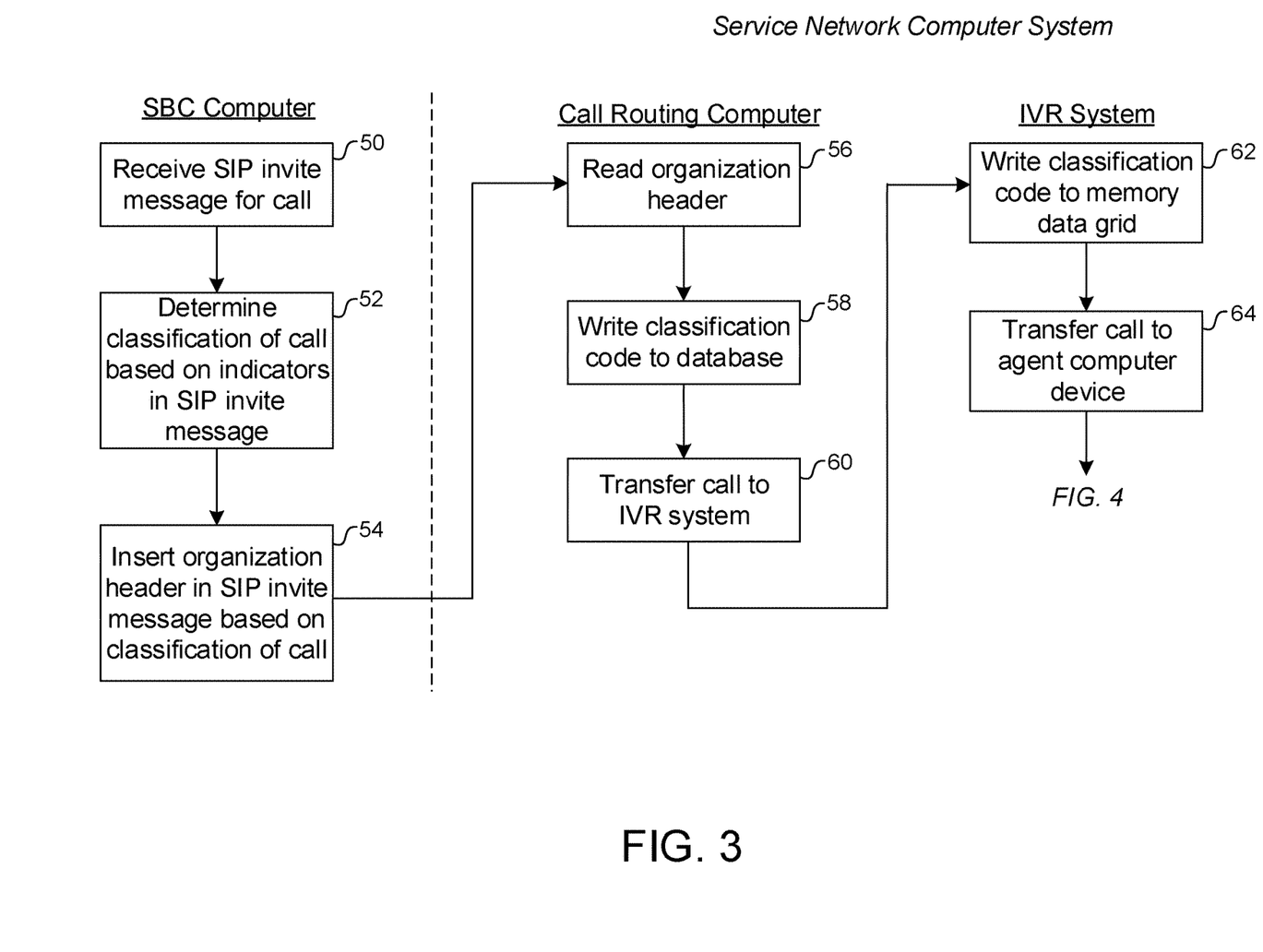
FIG. 3 is a flow chart illustrating an exemplary computer-implemented method for validating the origination of an incoming customer call on the wireless communication network, according to one embodiment.

Details of the steps that may be involved in validating the origination of an incoming customer call will be described in relation to FIGS. 3-4. Referring first to FIG. 3, the SBC computer 28 may receive a SIP invite message when the call is initiated within the network 10 (block 50). The SBC computer 28 may review the SIP invite message and, based on indicators in headers of the SIP invite message, determine the classification of the call (block 52). For instance, the SBC computer 28 may classify the call as validated if the indicators in the SIP invite message indicate that the call originated within the wireless communication network 10 from a device with a SIM registered on the wireless communication network 10. Alternatively, the SBC computer 28 may classify the call as having an unknown origination, or as originating on the PSTN 32. Other or additional call classifications may be used in alternative embodiments. The SBC computer 28 may then insert an organization header into the SIP invite message based on the call classification (block 54), and transfer the call request to the call routing computer 34 of the service network computer system 24.

At a block 56, the call routing computer 34 may read the organization header in the SIP invite message to extract the classification of the call. A classification code corresponding to the classification in the organization header may then be written to the database 36 via the call routing computer 34 (block 58). In some embodiments, the classification codes may include V (for validated), U (for unknown origination), and P (for calls originated on the PSTN), although other or additional classification codes may be used in practice. The call routing computer 34 may then transfer the call to the IVR computer system 38 (block 60) for directing the call to the service agent if selected by the caller. In the process of treating and directing the call, the IVR computer system 38 may also write the classification code of the call to the memory data grid 40 (or other database accessible to the agent computer device 42) so that the classification code may be accessed from the agent computer device 42 (block 62). The classification code stored in the memory data grid 40 may be linked with the call identification information, such as a unique ID of the call. At a block 64, the call may be transferred to the agent computer device 42 via the IVR computer system 38.

Figure 4:
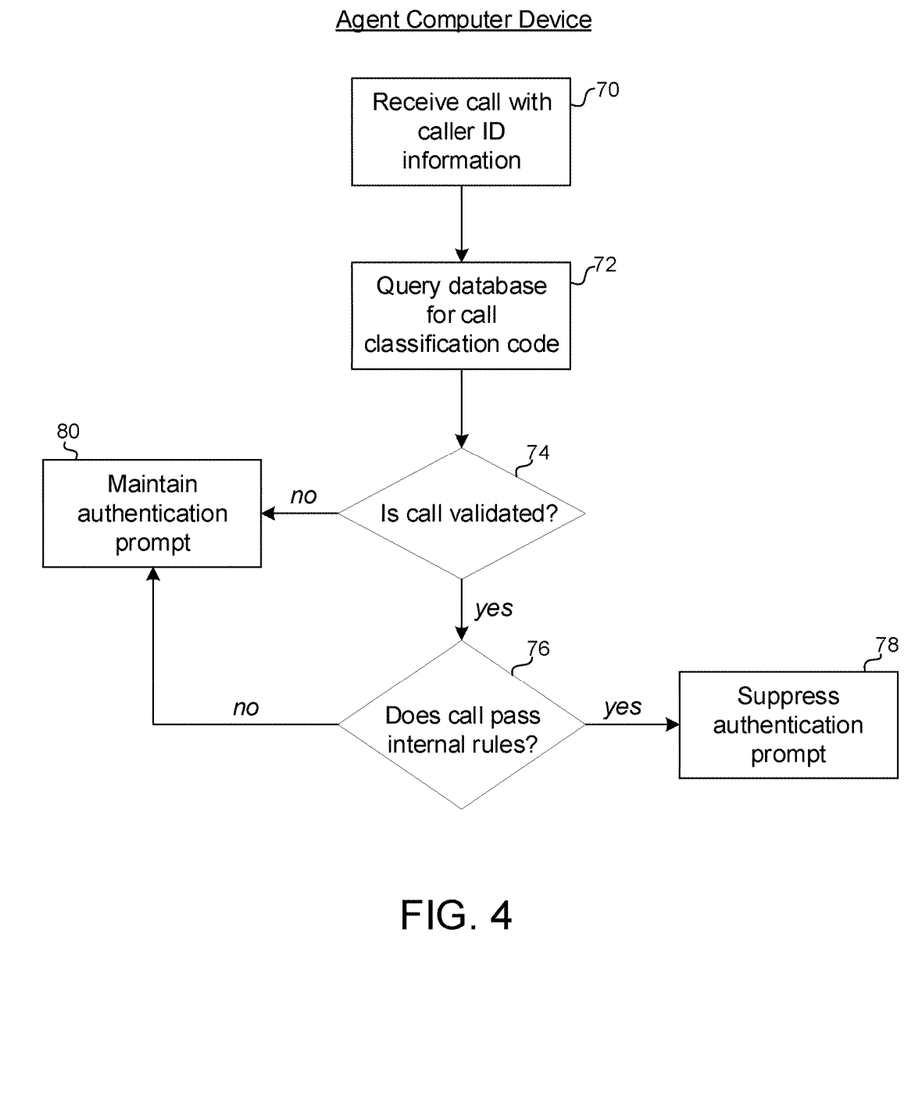
FIG. 4 is a flow chart of additional steps in the computer-implemented method for validating the origination of the incoming customer call, according to one embodiment.

Turning to FIG. 4, the call may be received at the agent computer device 42 with caller identification information at a block 70. The caller identification information may be viewable at the user interface of the agent computer device 42 and may include a customer identification, such as a customer ID number, and a unique ID of the call. An application or program of the agent computer device 42 may use the unique ID (or other call identifier) of the call to query the memory data grid 40 to retrieve the classification code of the call (block 72). If the classification code indicates that the call is validated (as determined at a block 74), the agent computer device application or program may apply logic to determine whether the call passes internal rules and qualifies for bypassing an authentication step involved in call authentication (block 76). For example, certain sensitive or high risk transactions or new accounts may not qualify for bypassing authentication steps. If the call passes the internal rules, the agent computer application or software may suppress prompts related to the authentication step according to a block 78. In one embodiment, the block 78 may involve suppressing a OTP prompt at the user interface of the agent computer device 42 used in multifactor authentication. The OTP may be a code sent to the customer's device that the customer reads back to the agent to prove possession of the device, such as when the customer forgot his or her account passcode and wishes to reset the passcode, or wishes to conduct a high security transaction. If, however, the call is not validated according to the classification code (as determined at the block 74) or does not pass the internal rules (as determined at the block 76), the authentication prompt (e.g., the OTP prompt) at the agent computer device 42 may be maintained (block 80).

Figure 5:
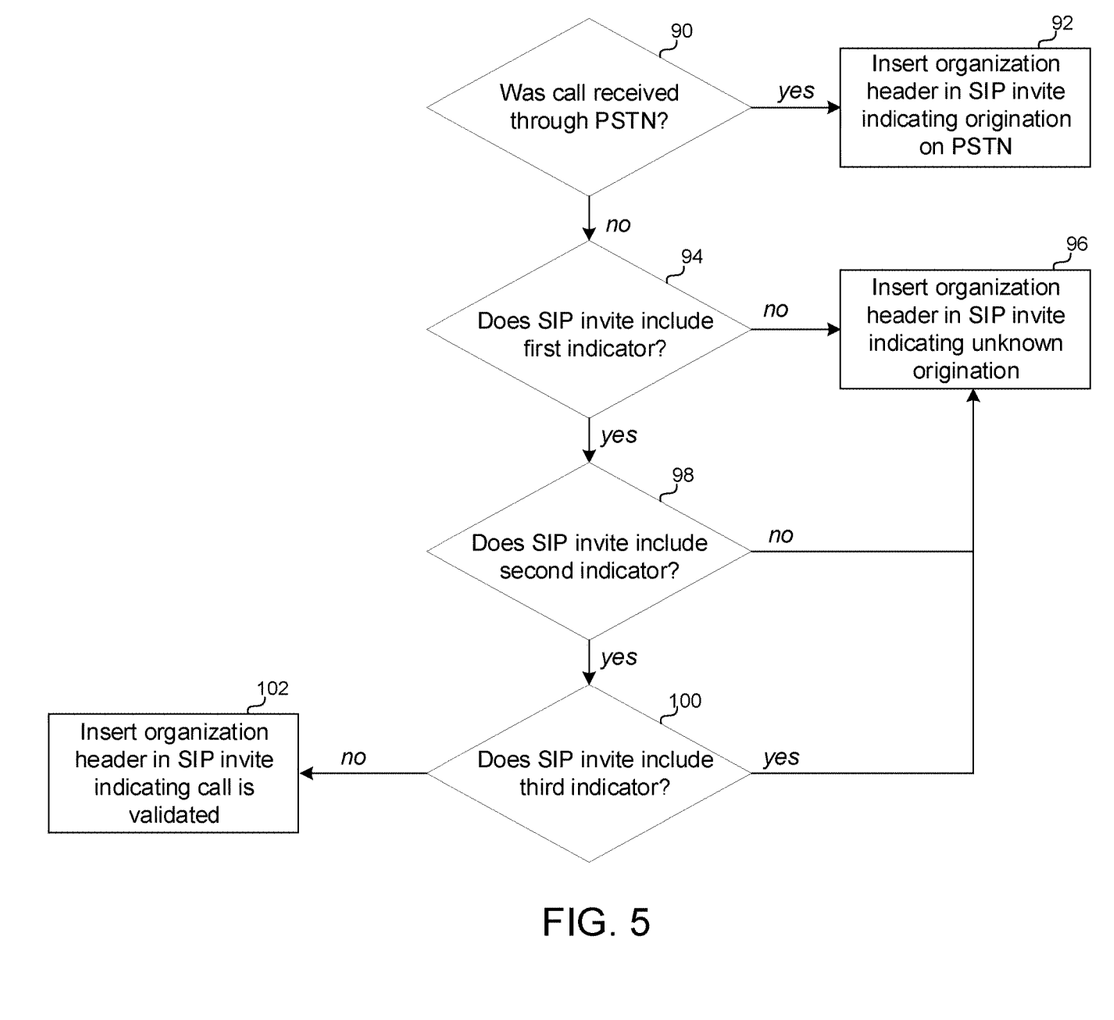
FIG. 5 is a flow chart illustrating an exemplary computer-implemented method for determining a classification of the incoming customer call and inserting a corresponding organization header in a SIP invite message of the incoming customer call, according to one embodiment.

FIG. 5 shows a series of steps that may be involved in determining a classification of an incoming call and inserting a corresponding organization header in the SIP invite message of the incoming call as performed by the SBC computer 28 (blocks 52 and 54 of FIG. 3). At a block 90, it may be determined whether the call was received through the PSTN 32. If so, the call is not validated, and an organization header may be inserted in the SIP invite message indicating that the call originated on the PSTN 32 (block 92). If the call was not received through the PSTN 32 (and was received through the EPC 20), the SBC 28 may review one or more indicators in the SIP invite message of the call to determine whether or not the call can be validated. At a block 94, the SBC computer 28 may determine whether the SIP invite message includes a header with a first indicator indicating that the call originated from a phone number provided by a carrier of the network 10. In one aspect, the first indicator may be a STIR/SHAKEN certification. If the SIP invite message does not include the first indicator, an organization header may be inserted in the SIP invite message indicating that the call has an unknown origination (block 96).

If the SIP invite message does include the first indicator, it may be determined whether the SIP invite message includes a header with a second indicator indicating that the call originated from a device with a SIM (block 98). In one embodiment, the second indicator may be an international mobile equipment identity (IMEI) number which confirms that the call originated from a device with a SIM. If the SIP invite message lacks the second indicator, an organization header may be inserted in the SIP invite indicating that the call has an unknown origination (block 96). If the SIP invite message includes the second indicator, it may be determined whether the SIP invite message includes a third indicator indicating that the call has been forwarded (block 100). In one embodiment, the third indicator may be a diversion information header or a history information header which flags forwarded calls. If the SIP invite message includes the third indicator, an organization header may be inserted in the SIP invite indicating the call has an unknown origination (block 96). If, however, the SIP invite message lacks the third indicator (indicating that the call has not been forwarded), the call may be classified as validated and the SBC computer 28 may insert an organization header in the SIP invite message indicating that the call is validated (block 102). Thus, according to the method of FIG. 5, only those calls that include the first and second indicators and lack the third indicator are classified as validated. Stated in another way, only those calls that have a STIR/SHAKEN certification, originated from a device with a SIM, and are not forwarded are marked as validated in the organization header of the SIP invite message. It is noted the method of FIG. 5 is exemplary, and the steps of the method may be performed in different orders or simultaneously in practice.

Although the steps of FIGS. 3-5 are shown as being performed by certain computer components of the wireless communication network 10, it will be understood that the steps may be distributed differently across the computer components, or alternative computer components capable of performing the aforementioned steps may be used in alternative embodiments. For instance, one or more alternative computer systems capable of performing any of the aforementioned functions of the SBC computer 28, the call routing computer system 34, the IVR computer system 38, and/or the agent computer device 42 may be used in alternative arrangements without deviating from the scope of the present disclosure. In yet other alternative arrangements, a single computer system may perform the steps of FIGS. 3-5.

Figure 6:
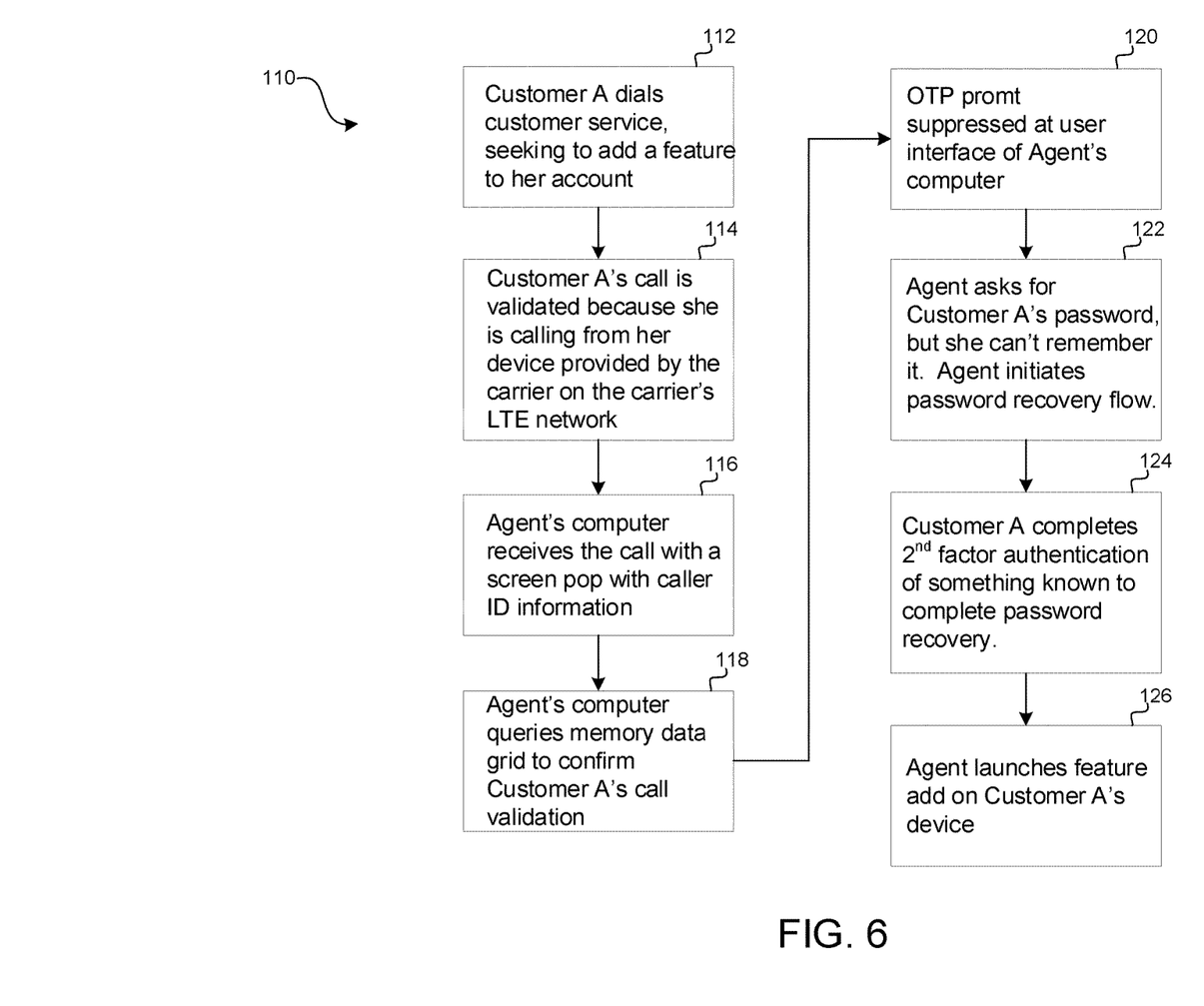
FIG. 6 is a flow chart of steps involved in an exemplary customer service call in the wireless communication network, according to one embodiment.

Turning to FIG. 6, a use of the system 30 is illustrated with steps involved in an exemplary customer service call 110 made within the wireless communication network 10. At a first block 112, customer A may dial customer service of a carrier of the wireless communication network 10, seeking to add a feature to her account. As customer A places her call from her SIM device provided by the network carrier, the call is validated through the SBC 28 and the call routing computer 34 according to the steps described in relation to FIGS. 3 and 5 above (block 114). After passing through the IVR computer system 38 and making the appropriate selection to speak with a customer service agent, customer A's call may be received at the agent computer device 42 with a screen pop at the user interface having caller identification information including a unique ID of the call (block 116) allowing the agent computer device 42 to begin loading the customer's account. At a block 118, the agent computer device 42 may query the memory data grid 40 using the caller identification information (unique call ID) to confirm that customer A's call has been validated by the system 30. Once the validation has been confirmed and the agent computer device 42 determines that the call passes any internal checks, a OTP prompt at a user interface of the agent computer device 42 may be suppressed (block 120).

At a block 122, the customer service agent may ask customer A for her customer care password to unlock access to her account, and customer A may indicate that she does not remember it. As the OTP authentication step is suppressed at the agent computer device due to successful call validation, the customer service agent may directly initiate password recovery flow, bypassing the OTP authentication step (block 122). At a block 124, customer A may complete second factor authentication of something known (e.g., mother's maiden name, favorite pet name, etc.) to complete password recovery. With the password recovered, the customer service agent may access customer A's account and launch the requested feature on customer A's device via the agent computer device 42 (block 126).

Figure 7:
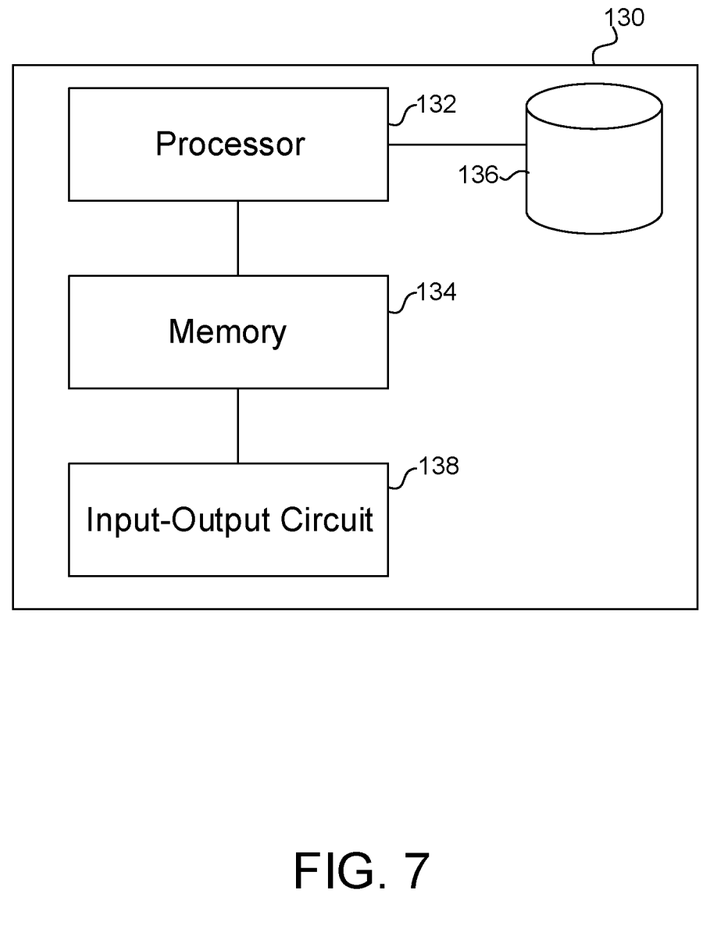
FIG. 7 is a schematic representation of an exemplary computer system of the wireless communication network, according to one embodiment.

An exemplary computer system 130 of the wireless communication network 10 is shown in FIG. 7. The computer system 130 may be representative of any of the aforementioned computer systems/devices of the network computer system 26 or the service network computer system 24 including the SBC computer 28, the call routing computer 34, the IVR computer system 38, and the agent computer device 42. The computer system 130 may include one or more processors 132 configured to execute instructions for performing the relevant steps of FIGS. 3-5, a memory 134 configured to store the computer-executable instructions and assist the processor 132, and one or more databases 136 associated with the memory 134. For instance, the database 136 may store the classification codes of the incoming customer calls for access by the agent computer device 42. The computer system 130 may further include an input-output circuit 138 involved in sending and receiving calls or data to and from other computer components of the network 10.

Although the present disclosure is focused on the example of validating incoming customer service calls on the wireless communication network 10, the system and methods of the present disclosure may also be applicable to any type of call requiring validation within a single wireless communication network including retail customer calls, human resource calls, internal employee calls, and technical assistance calls, to name a few.

The present disclosure provides new logic and functions to the network computer systems to validate the origination of calls. The computer systems of the wireless communication network are modified to review the SIP invite messages of incoming calls to look for specific indicators that validated that the call originated within the wireless communication network from a device with a SIM registered in the wireless communication network, and to write an organization header into the SIP invite message to verify that the call is validated. This information is accessible to the computer device that receives the call allowing one or more call authentication steps to be skipped. In the customer service environment, bypassing an authentication step (e.g., the OTP), may save seconds or minutes of agent and customer time for each call. In terms of the network carrier's business expenses, this may save thousands of hours of customer service time each week. Moreover, the internal call validation process through information in the call SIP invite messages is more secure than OTPs which may be vulnerable to SMS intercept.

What is claimed is:

1. A computer-implemented method for validating the origination of an incoming call on a wireless communication network, comprising:
    receiving a session initiation protocol (SIP) invite message at the wireless communication network when the call is initiated;
    determining, based on indicators in the SIP invite message, whether the call is validated as originating within the wireless communication network from a device with a subscriber identity module (SIM) registered in the wireless communication network, the call origination is unknown, or the call originated on the public service telephone network (PSTN);
    associating the call with a classification code that classifies the call according to whether the call is validated, the call origination is unknown, or the call originated on the PSTN;
    writing the classification code to a database accessible by an agent computer device in the wireless communication network, the classification code being linked with caller identification information of the call;
    receiving the call at the agent computer device with the caller identification information;
    querying the database via the agent computer device according to the caller identification information to obtain the classification code of the call and determine if the call is validated; and
    suppressing, via the agent computer device, a one-time pin (OTP) prompt used for call authentication if the call is validated.

2. The computer-implemented method of claim 1, wherein determining whether the call is validated as originating within the wireless communication network from a device with a SIM on the wireless communication network comprises:
    determining whether the SIP invite message includes a header with a first indicator indicating that the call originated from a phone number provided by a carrier of the wireless communication network;
    determining whether the SIP invite message includes a header with a second indicator indicating that the call originated from a device with a SIM;

determining whether the SIP invite message includes a header with a third indicator indicating that the call was call forwarded; and determining that the call is validated if the SIP invite message includes the first and second indicators and lacks the third indicator.

3. The computer-implemented method of claim 2, wherein the first indicator is a STIR/SHAKEN certification.

4. The computer-implemented method of claim 2, wherein the second indicator is an international mobile equipment identity (IMEI) number.

5. The computer-implemented method of claim 2, wherein the third indicator is a diversion information header or a history information header.

6. The computer-implemented method of claim 1, wherein determining whether the call origination is unknown comprises determining that the call origination is unknown if the SIP invite message lacks a header with a STIR/SHAKEN certification.

7. The computer-implemented method of claim 1, further comprising inserting an organization header in the SIP invite message indicating the classification code of the call.

8. The computer-implemented method of claim 1, wherein writing the classification code to the database comprises:

transferring the call to an interactive voice response (IVR) system; and writing, via the IVR system, the classification code to a memory data grid accessible to the agent computer device.

9. The computer-implemented method of claim 1, wherein the agent computer device is a customer service agent computer device.

10. A system for validating the origination of incoming customer calls in a single wireless communication network, comprising:

a network computer system on the wireless communication network and including one or more processors, a memory, and an input-output circuit, the one or more processors being configured according to computer-executable instructions for:

receiving a session initiation protocol (SIP) message at the wireless communication network when the customer call is initiated, determining that the customer call is validated if the SIP message includes one or more indicators indicating that the call originated within the wireless communication network from a device with a subscriber identity module (SIM) registered in the wireless communication network, inserting an organization header in the SIP message indicating that the customer call is validated if the SIP message includes the one or more indicators, and based on the organization header in the SIP message, writing a classification code to a database that classifies the customer call as validated; and an agent computer device on the wireless communication network and including a processor, a memory, and an input-output circuit, the processor being configured according to computer-executable instructions for:

receiving the customer call via the network computer system with caller identification information, querying the database according to the caller identification information to obtain the classification code of the customer call and determine if the customer call is validated, and suppressing a pin prompt used for call authentication at a user interface of the agent computer device if the customer call is validated.

11. The system of claim 10, wherein determining that the customer call is validated comprises:

determining whether the SIP message includes a first indicator indicating that the customer call originated from a phone number provided by a carrier of the wireless communication network;

determining whether the SIP message includes a second indicator indicating that the customer call originated from a device with a SIM;

determining whether the SIP message includes a third indicator indicating that the call was call forwarded; and determining that the call is validated if the SIP message includes the first and second indicators and lacks the third indicator.

12. The system of claim 11, wherein the first indicator is a STIR/SHAKEN certification.

13. The system of claim 12, wherein the one or more processors of the network computer system are further configured according to computer-executable instructions for determining that an origination of the customer call is unknown if the SIP message lacks the STIR/SHAKEN certification, inserting an organization header in the SIP message indicating that the origination of the customer call is unknown, and writing a classification code to the database that classifies the customer call as having an unknown origination, and wherein the pin prompt is not suppressed if the classification code classifies the customer call as having an unknown origination.

14. The system of claim 11, wherein the second indicator is an international mobile equipment identity (IMEI) number.

15. The system of claim 11, wherein the third indicator is a diversion information header or a history information header.

16. The system of claim 10, wherein writing the classification code to the database comprises:

transferring the call to an interactive voice response (IVR) system; and writing, via the IVR system, the classification code to a memory data grid accessible to the agent computer device.

17. The system of claim 10, further comprising a service network computer system within the wireless communication network that includes a call routing computer and the agent computer device, the call routing computer including a processor configured according to computer-executable instructions for reading the organization header and writing the classification code to the database.

18. The system of claim 10, wherein the pin prompt is used to initiate multifactor call authentication.

* * * * *

UNITED STATES PATENT AND TRADEMARK OFFICE
CERTIFICATE OF CORRECTION

| | | |
|---|---|---|
| PATENT NO. | : 11,425,241 B2 | Page 1 of 1 |
| APPLICATION NO. | : 17/115323 | |
| DATED | : August 23, 2022 | |
| INVENTOR(S) | : Milligan et al. | |

It is certified that error appears in the above-identified patent and that said Letters Patent is hereby corrected as shown below:

On the Title Page

Under item (72), add the following inventors:
Homer Nicholas B. Filart; Renton, WA (US)
Dinko Dinkov; Kirkland, WA (US)

Signed and Sealed this
Ninth Day of September, 2025

Coke Morgan Stewart
*Acting Director of the United States Patent and Trademark Office*